(12) United States Patent
Reed

(10) Patent No.: US 6,397,513 B1
(45) Date of Patent: Jun. 4, 2002

(54) HOOK REMOVING APPARATUS

(76) Inventor: Robert S. Reed, 609 SE. 1st Ter., Cape Coral, FL (US) 33990

( * ) Notice: Subject to any disclaimer, the term of this patent is extended or adjusted under 35 U.S.C. 154(b) by 0 days.

(21) Appl. No.: 09/697,980

(22) Filed: Oct. 26, 2000

(51) Int. Cl.[7] .............................................. A01K 97/18
(52) U.S. Cl. ..................................... 43/53.5; 224/251
(58) Field of Search ............................ 43/53.5; 294/26, 294/19.1; 224/251, 920

(56) References Cited

U.S. PATENT DOCUMENTS

| | | | | | |
|---|---|---|---|---|---|
| 1,131,669 A | * | 3/1915 | Bremer | .................. | 224/251 |
| 2,500,257 A | | 3/1950 | Mahan | .................. | 224/251 |
| 2,749,653 A | * | 6/1956 | Patrowsky et al. | .......... | 43/53.5 |
| D186,313 S | | 10/1959 | Hill | .................. | 43/53.5 |
| D199,737 S | | 12/1964 | Cross, Jr. | ............... | 43/53.5 |
| 3,401,857 A | * | 9/1968 | Wilson et al. | ............ | 224/920 |
| 3,603,021 A | | 9/1971 | Nunley | .................. | 43/53.5 |
| 3,706,154 A | * | 12/1972 | Luebbers et al. | .......... | 43/53.5 |
| 3,713,243 A | | 1/1973 | Tetzner | .................. | 43/53.5 |
| 3,888,038 A | * | 6/1975 | Howell | .................. | 43/53.5 |
| 4,068,400 A | * | 1/1978 | McCoy | .................. | 43/53.5 |
| 4,127,957 A | * | 12/1978 | Bourquin | .................. | 43/53.5 |
| 4,206,561 A | * | 6/1980 | Wong et al. | ............... | 43/53.5 |
| 5,337,511 A | * | 8/1994 | Ashbaugh | ............... | 224/920 |
| 5,439,263 A | * | 8/1995 | Chambers | ............... | 294/26 |
| 5,518,284 A | * | 5/1996 | Lynn | .................. | 294/26 |
| 5,660,099 A | * | 8/1997 | Figueira, Jr. | ............ | 294/26 |
| 5,934,009 A | * | 8/1999 | Trahan | .................. | 43/53.5 |

FOREIGN PATENT DOCUMENTS

| | | | | |
|---|---|---|---|---|
| GB | 2028072 B1 | * | 3/1980 | .................. 43/53.5 |
| JP | 7-50969 B1 | * | 2/1995 | |
| JP | 11-225641 B1 | * | 8/1999 | |
| JP | 2000-106803 B1 | * | 4/2000 | |

* cited by examiner

*Primary Examiner*—Darren W. Ark

(57) ABSTRACT

A fishhook removing apparatus for removing hooks from a fish's mouth. The fishhook removing apparatus includes a fishhook remover comprising a shaft. The shaft includes a first end and a second end. The first end of the shaft includes a bend therein. The bend is positioned generally adjacent to the first end such that a hook portion is defined. A handle member is securably coupled to the shaft.

13 Claims, 2 Drawing Sheets

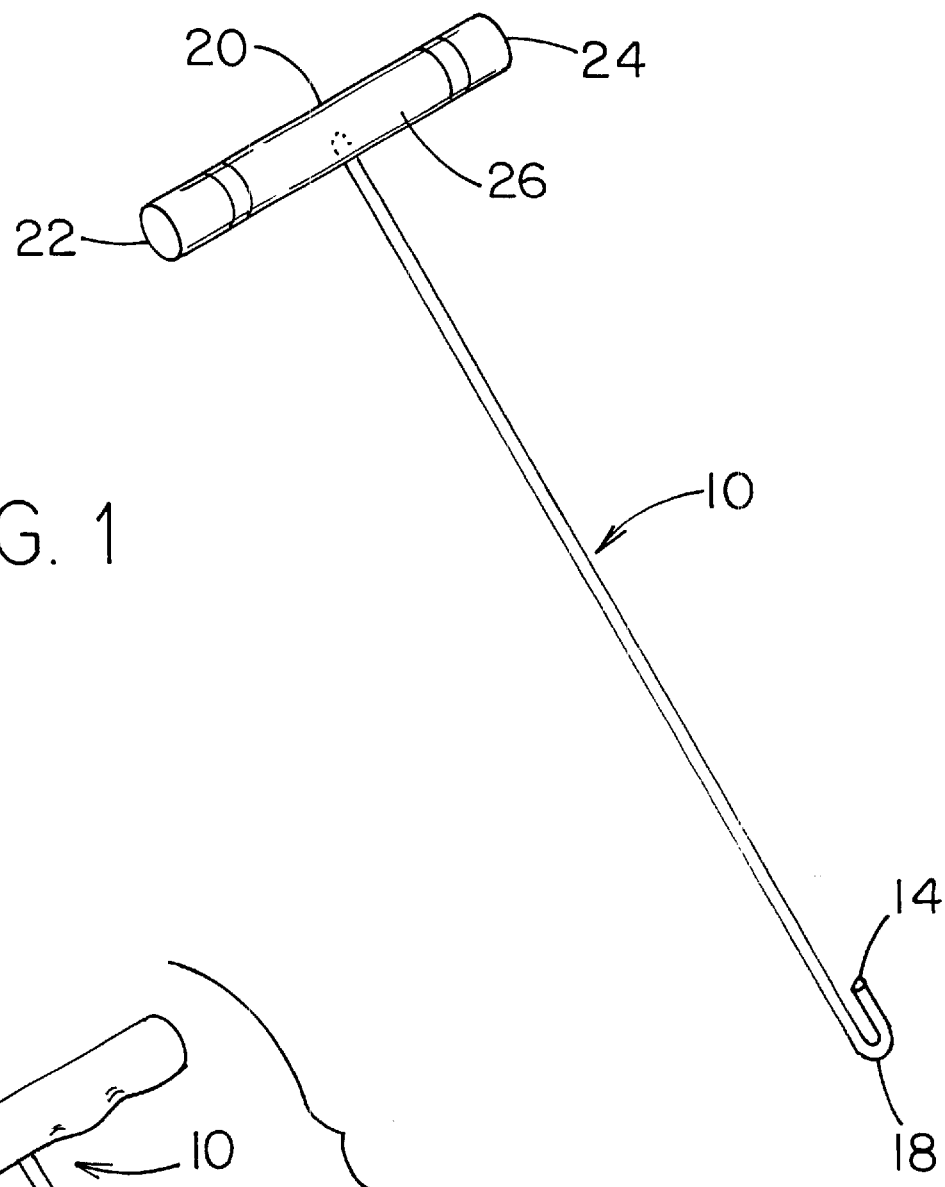

HOOK REMOVING APPARATUS

BACKGROUND OF THE INVENTION

1. Field of the Invention

The present invention relates to hook removers and more particularly pertains to a new hook removing apparatus for removing hooks from fish without touching them.

2. Description of the Prior Art

The use of hook removers is known in the prior art. More specifically, hook removers heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 3,603,021; 3,713,243; 3,888,038; 4,127,957; U.S. Patent No. Des. 199,737; U.S. Patent No. Des. 186,313.

While these devices fulfill their respective, particular objectives and requirements, the aforementioned patents do not disclose a new hook removing apparatus. The inventive device includes a fishhook remover for removing fishing hooks from a fish's mouth without touching the fish. The fishhook remover comprises a shaft. The shaft includes a first end and a second end. The first end of the shaft includes a bend therein. The bend is positioned generally adjacent to the first end such that a hook portion is defined. A handle member is securably coupled to the shaft.

In these respects, the hook removing apparatus according to the present invention substantially departs from the conventional concepts and designs of the prior art, and in so doing provides an apparatus primarily developed for the purpose of removing hooks from fish without touching them.

SUMMARY OF THE INVENTION

In view of the foregoing disadvantages inherent in the known types of hook removers now present in the prior art, the present invention provides a new hook removing apparatus construction wherein the same can be utilized for removing hooks from fish without touching them.

The general purpose of the present invention, which will be described subsequently in greater detail, is to provide a new hook removing apparatus apparatus and method which has many of the advantages of the hook removers mentioned heretofore and many novel features that result in a new hook removing apparatus which is not anticipated, rendered obvious, suggested, or even implied by any of the prior art hook removers, either alone or in any combination thereof.

To attain this, the present invention generally comprises a fishhook remover for removing fishing hooks from a fish's mouth. The fishhook remover comprising a shaft. The shaft includes a first end and a second end. The first end of the shaft includes a bend therein. The bend is positioned generally adjacent to the first end such that a hook portion is defined. A handle member is securably coupled to the shaft.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new hook removing apparatus apparatus and method which has many of the advantages of the hook removers mentioned heretofore and many novel features that result in a new hook removing apparatus which is not anticipated, rendered obvious, suggested, or even implied by any of the prior art hook removers, either alone or in any combination thereof.

It is another object of the present invention to provide a new hook removing apparatus which may be easily and efficiently manufactured and marketed.

It is a further object of the present invention to provide a new hook removing apparatus which, is of a durable and reliable construction.

An even further object of the present invention is to provide a new hook removing apparatus which is susceptible of a low cost of manufacture with regard to both materials and labor, and which accordingly is then susceptible of low prices of sale to the consuming public, thereby making such hook removing apparatus economically available to the buying public.

Still yet another object of the present invention is to provide a new hook removing apparatus which provides in the apparatuses and methods of the prior art some of the advantages thereof, while simultaneously overcoming some of the disadvantages normally associated therewith.

Still another object of the present invention is to provide a new hook removing apparatus for removing hooks from fish without touching them.

Yet another object of the present invention is to provide a new hook removing apparatus which includes a fishhook remover for removing fishing hooks from a fish's mouth without touching the fish. The fishhook remover comprises a shaft. The shaft includes a first end and a second end. The first end of the shaft includes a bend therein. The bend is positioned generally adjacent to the first end such that a hook portion is defined. A handle member is securably coupled to the shaft.

Still yet another object of the present invention is to provide a new hook removing apparatus that allows a user to avoid having to touch the fish thereby reducing the chances of being injured from the fish's fins.

Event still another object of the present invention is to provide a new hook removing apparatus that reduces the possibility of a user being injured by the fishing hook.

An even further object of the present invention is to provide a new hook removing apparatus that provides as little stress to the fish as possible by not touching them.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a schematic perspective view of a new hook removing apparatus according to the present invention.

FIG. 2 is a schematic perspective view of the present invention showing variations of the handle member.

DESCRIPTION OF THE PREFERRED EMBODIMENT

Figure 3:
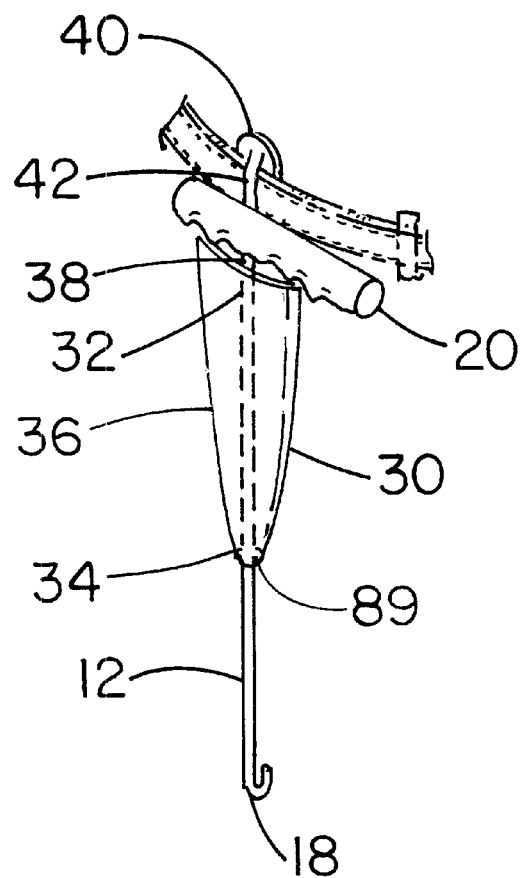
FIG. 3 is a schematic perspective view of the present invention showing the invention in the tubular member.
Figure 4:
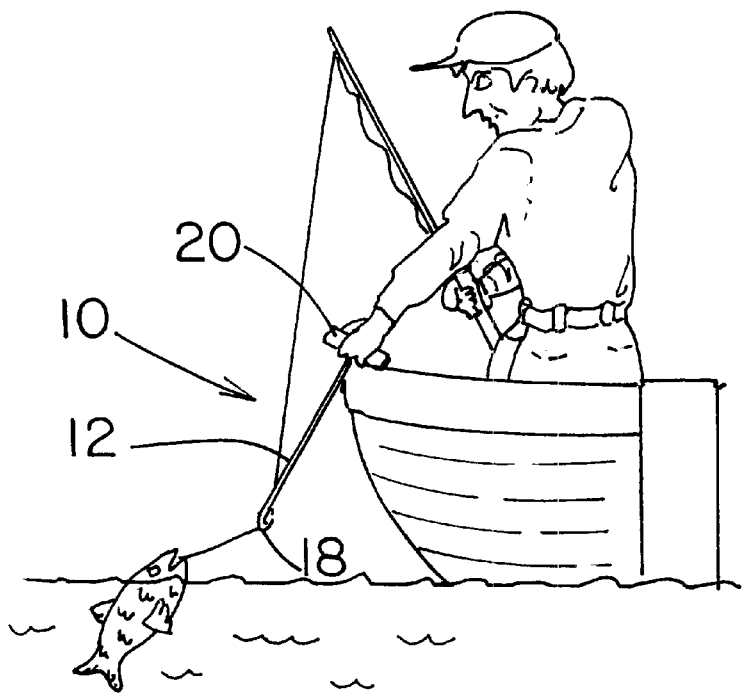
FIG. 4 is a schematic perspective view of the present invention showing the invention being used.

With reference now to the drawings, and in particular to FIGS. 1 through 4 thereof, a new hook removing apparatus embodying the principles and concepts of the present invention and generally designated by the reference numeral 10 will be described.

As best illustrated in FIGS. 1 through 4, the hook removing apparatus 10 generally comprises a fishhook removing apparatus 10 for removing fishing hooks from a fish's mouth. The fishhook removing apparatus 10 comprises a shaft 12. The shaft is elongated and includes a first end 14 and a second end 16. The first end 14 of the shaft 12 includes a bend 18 therein. The bend 18 is positioned generally adjacent to the first end 14 such that a hook portion is defined. The hook removing apparatus 10 includes a handle member 20. The handle member 20 is elongated and includes a first end 22 and a second end 24 with a peripheral wall 26 extending therebetween. The second end 16 of the shaft 12 extends into and is securely coupled to the peripheral wall 26. The shaft 12 is secured in the handle member 20 by an adhesive means or by having the second end 16 of the shaft 12 having threads thereon allowing the second end 16 to burrow into the handle member 20. The shaft 12 is positioned generally between the first and second ends 22 and 24 and is orientated generally perpendicular to the handle member 20.

The handle member 20 includes a generally cylindrical shape. However, the handle member 20 may have an ergonomic shape to allow the user to more comfortably use the invention. The handle member 20 comprises a floatable material. The floatable material allows the user to recover the invention if it should happen to fall into the water. The handle member 20 may be made out of any lightweight material that will float such as wood or cork filled plastic. The handle member 20 may also comprise recesses 27, 28 formed in opposite ends of the handle member 20, wherein each recess extends from its respective end toward the other end. Plugs 29 formed of a material that floats in water are positioned in each of the recesses.

The invention may be stored in a tubular member 30. The tubular member 30 includes a first end 32 and a second end 34 with a peripheral wall 36 extending therebetween. Each of the ends 32 and 34 includes an opening therein, with the end 32 having an opening 38 and the end 34 having an opening 89. The shaft member 12 is removably positionable in the tubular member 30. In an embodiment, the first end 14 of the shaft 12 extends through the opening 89 in the second end 34 of the tubular member 30 and away therefrom. The peripheral wall 36 includes a generally frustoconical shape. Other shapes could also be used such as cylindrical or rectangular.

A securing means 40 for removably securing the tubular member 30 to a belt of a user is adopted in the embodiment. The securing means 40 is securably coupled to the peripheral wall 36 of the tubular member 30 and is positioned generally adjacent to the first end 32 of the tubular member 30. The securing means 40 comprises clip 42. The clip 42 generally has a hook shape with one side being coupled to the invention and the other side hooking over the user's belt. The securing means 40 could also be a tying means such as rope or cord, allowing the user to tie the tubular member to any location.

In use the fishhook remover 10 is removed from the tubular member 30. The bend 18 in the shaft 12 is hooked over the fishing line. The shaft 12 is then brought down to the fish's mouth where the bend 18 engages the hook. The user then shakes the handle member 20 that rotates the shaft 12. The bend 18 then removes the hook from the fish's mouth.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A fishhook removing system for removing fishing hooks from a fish's mouth, said system comprising:
    a fishhook removing apparatus comprising:
        a shaft having a first end and a second end, said shaft having a bend therein positioned generally adjacent to said first end such that a hook portion is defined;
        a handle member being mounted on said shaft, said handle member being elongated with opposite ends, each of said ends of said handle member having a recess formed therein which extends from said each end toward the other of said ends of said handle, each of said recesses having a plug positioned therein, each of said plugs being formed of a material that floats in water.

2. The fishhook removing system of claim 1, wherein said handle member has a first end and a second end with a peripheral wall extending therebetween, said second end of said shaft extending in and securably coupled to said peripheral wall, said shaft being positioned generally between said first and second ends and orientated generally perpendicular to said handle member.

3. The fishhook removing system of claim 2, wherein said handle member further has a generally cylindrical shape.

4. The fishhook removing system of claim 2, wherein said peripheral wall has an ergonomic shape.

5. The fishhook removing system of claim 1, further comprising:
   a holster including a tubular member, said tubular member having a first end and a second end with a peripheral wall extending therebetween, each of said ends having an opening therein, said shaft being removably positionable in said tubular member, wherein said first end of said shaft extends through said opening in said second end of said tubular member and away therefrom when said shaft is positioned in said tubular member.

6. The fishhook removing system of claim 5, wherein said peripheral wall has a generally frusto-conical shape.

7. The fishhook removing system of claim 5, further comprising:
   a securing means for removably securing said tubular member to a belt of a user, said securing means being securably coupled to said peripheral wall and positioned generally adjacent to said first end of said tubular member.

8. The fishhook removing system of claim 7, wherein said securing means comprises a clip.

9. The fishhook removing system of claim 1, wherein a longitudinal axis of the handle member extends substantially perpendicular to a longitudinal axis of the shaft.

10. The fishhook removing system of claim 1, additionally comprising a holster for supporting said fishhook removing apparatus on a belt of a user, said holster including
   a tubular member having a first end and a second end with a peripheral wall extending therebetween, each of said ends having an opening therein, said shaft of said fishhook removing apparatus being removably positionable in said tubular member, wherein a distance between said first and second ends of said tubular member is less than a distance between said first and second ends of said shaft such that said first end of said shaft extends through said opening in said second end of said tubular member when said shaft is positioned in said tubular member.

11. The fishhook removing system of claim 10, wherein said peripheral wall of said tubular member has a generally frusto-conical shape with a width that tapers smaller from said first end to said second end.

12. The fishhook removing system of claim 10, wherein said holster further comprises a securing means for removably securing said tubular member to a belt of a user.

13. A fishhook removing system for removing fishing hooks from a fish's mouth, said system comprising:
   a fishhook removing apparatus comprising:
      a shaft having a first end and a second end, said shaft having a bend therein positioned generally adjacent to said first end such that a hook portion is defined;
      a handle member being mounted on said shaft, said handle member being elongated with opposite ends, at least one of said ends of said handle member having a recess formed therein which extends from said at least one end toward the other of said ends of said handle, said recess having a plug positioned therein, said plug being formed of a material that floats in water;
      wherein said handle member is elongated and has a first end and a second end with a peripheral wall extending therebetween, said second end of said shaft extending in and securably coupled to said peripheral wall, said shaft being positioned generally between said first and second ends and orientated generally perpendicular to said handle member;
      wherein said handle further has a generally cylindrical shape;
      wherein said handle member has a longitudinal axis extending substantially perpendicular to a longitudinal axis of the shaft;
   a holster for supporting said fishhook removing apparatus on a belt of a user, said holster including
      a tubular member having a first end and a second end with a peripheral wall extending therebetween, each of said ends having an opening therein, said shaft of said fishhook removing apparatus being removably positionable in said tubular member, wherein a distance between said first and second ends of said tubular member is less than a distance between said first and second ends of said shaft such that said first end of said shaft extends through said opening in said second end of said tubular member when said shaft is positioned in said tubular member;
      wherein said peripheral wall of said tubular member has a generally frusto-conical shape with a width that tapers smaller from said first end to said second end;
      wherein said holster further comprises a securing means for removably securing said tubular member to a belt of a user; and
      wherein said securing means comprises a clip.

* * * * *